Patented June 8, 1948

2,442,928

UNITED STATES PATENT OFFICE 2,442,928

FOOD PRODUCTS AND METHOD OF MAKING THEM

Majel M. MacMasters and Guido E. Hilbert, Peoria, Ill., assignors to United States of America as represented by the Secretary of Agriculture No Drawing. Application March 23, 1945, Serial No. 584,486

10 Claims. (Cl. 99—139)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to food products and is more particularly concerned with the preparation of products, such as candy, cookies, crackers, biscuits, bread, ice cream, and the like.

One of the objects of this invention is the preparation of food products of the type mentioned having a pleasingly crisp or crunchy texture.

Other objects and advantages of this invention will be apparent from the following description:

In general, our invention comprises forming an aqueous starch paste of any desired commercial starch, such as corn, wheat, potato, rice, tapioca, and so forth. Although the concentration of the paste may vary, concentrations in the range of 5 to 20 percent have been found satisfactory. The paste is heated to produce substantially complete gelatinization of the starch. Temperatures of 70° to 100° C. are suitable for this purpose. The gelatinized paste is then frozen slowly, preferably at 0° to —20° C. During this freezing process, crystals of ice are formed within the gel, and partial orientation of the starch material occurs. The frozen mass is then thawed, resulting in a porous, spongy, highly absorbent mass. This mass is then dried, such as in the open air or in a forced draft oven or in vacuo to a moisture content of about 2 to 15 percent by weight at a temperature below that at which appreciable dextrinization would take place.

The resulting product is rigid, porous, and, especially when containing less than 10 percent moisture, very crisp. It will hereinafter be referred to as "starch sponge."

This "starch sponge" is edible by itself. However, food flavorings or colorings, or both, are incorporated therewith. These may be incorporated in the fibrous structure either by impregnation of the "starch sponge" or by incorporating them into the original starch paste prior to freezing.

In addition to the various flavoring and coloring materials, other edible materials of a nutritious nature may be incorporated, such as vegetable and fruit juices or pastes, meat extracts, or concentrates, monosodium glutamate, egg powder, milk powder, vitamin concentrates, flour, and so forth.

The food product in any particular case may comprise "starch sponge" in any desired form. The "starch sponge" may be used in relatively large pieces or comminuted, such as by shredding, chopping, or grinding to any desired degree of fineness, such as powder. In comminuted form, it may be used for various purposes. It may be incorporated in fondants, icings and coatings of various kinds, and, in general, in any material where a crisp or crunchy texture is desired.

In a ground state it may be molded under pressure into wafers of various kinds and into any desired form, such as may be required as a base for coated products. The whole "starch sponge" may, on the other hand, be cut or carved into various shapes and designs with or without subsequent coating thereof.

The following specific examples illustrate a few of the numerous products that can be made in accordance with this invention.

Example 1

A starch paste is prepared containing, by weight, 39 parts commercial cornstarch (10% moisture), 26 parts sugar, 0.5 part salt, 0.7 part oil of peppermint, and 661 parts of water. The paste is then frozen in the manner indicated above, after which the resulting sponge is thawed and free water is pressed therefrom. It is then dried at 100° C. in a forced draft oven to a crisp, porous condition, after which it is cut into bars and impregnated with edible chocolate to form a delicious confection.

Any other flavoring may be substituted for the oil of peppermint, such as oil of anise, almond extract, vanilla extract, and so forth.

Example 2

In a manner similar to that described in Example 1, a food product is prepared from a paste containing the following ingredients:

| | Parts by weight |
|---|---|
| Cornstarch (10% moisture) | 41.0 |
| Sugar | 15.0 |
| Salt | 1.5 |
| Oil of anise | 0.7 |
| Water | 531.0 |

The crisp, porous product is then shredded and incorporated in edible milk chocolate, which, upon hardening, may be cut into small pieces and eaten as candy.

Example 3

The same as Example 1, except 39 parts of cornstarch, 8 parts of powdered sugar, 10 parts of almond extract, and 661 parts of water are used in making the paste, and the sponge obtained is dried to a moisture content of about 5 to 10%. The product is then shredded, and a confectioner's fondant is rolled into the shredded sponge.

Example 4

A sponge is prepared in the manner indicated above, using a paste containing 5 parts cornstarch (10% moisture) and 95 parts water. Upon drying to a crisp state, the starch sponge is comminuted to pass a 20-mesh screen, then incorporated in an edible chocolate and applied as a coating over flavored fondant centers.

Example 5

A sponge is prepared by freezing a starch paste containing the following ingredients:

|  | Parts by weight |
|---|---|
| Commercial cornstarch (10% moisture) | 58.0 |
| Tomato juice | 65.0 |
| Salt | 5.0 |
| Water | 580.0 |

Free liquid is pressed from the thawed sponge, which is then dried at 100° C. to a crisp, porous condition. The dry product is communiuted to pass 40-mesh. The comminuted material with a 5 to 8% moisture content is then pressed into wafers approximately ⅛ inch in thickness in a hydraulic press at 15,000 pounds pressure per square inch.

Example 6

A sponge is prepared by freezing a starch paste containing the following ingredients:

|  | Parts by weight |
|---|---|
| Commercial cornstarch (10% moisture) | 58.0 |
| Chocolate malted milk powder | 43.0 |
| Sugar | 8.0 |
| Salt | 3.5 |
| Vanilla extract | 5.0 |
| Water | 642.0 |

Free liquid is pressed from the thawed sponge, which is then dried at 100° C. to a crisp condition. The dried product is comminuted to pass 20-mesh, then approximately 10% by weight of dextrose is added, and the mixture is pressed into cakes approximately ½ inch thick in a hydraulic press at 10,000 pounds pressure per square inch. Each cake is then coated with an edible glazed icing to form a cookie-like confection.

Example 7

A sponge is prepared by freezing a starch paste containing the following ingredients:

|  | Parts by weight |
|---|---|
| Commercial cornstarch (10% moisture) | 39.0 |
| Bean soup concentrate | 84.0 |
| Salt | 6.0 |
| Water | 578.0 |

Free liquid is pressed from the sponge, which is then dried under compression to form a crisp, cracker-like product.

Having thus described our invention, we claim:

1. A process of manufacturing a food product comprising forming a paste by heating 4 to 20% commercial starch in water to 70° to 100° C.; mixing an edible material into the paste; freezing the mixture at 0° to −20° C., whereby the material is formed into a sponge; then thawing, expressing free liquid, and drying the sponge to a moisture content of about 2 to 15% at a temperature below that at which appreciable dextrinization takes place.

2. A process of manufacturing a food product comprising forming a paste by heating 4 to 20% commmercial starch in water to 70° to 100° C.; mixing an edible material into the paste; freezing the mixture at 0° to −20° C., whereby the material is formed into a sponge; then thawing, expressing free liquid, and drying the sponge to a moisture content of about 2 to 15% at a temperature below that at which appreciable dextrinization takes place; and then shredding the dried sponge.

3. A process of manufacturing a food product comprising forming a paste by heating 4 to 20% commercial starch in water to 70° to 100° C.; mixing an edible material into the paste; freezing the mixture at 0° to −20° C., whereby the material is formed into a sponge; then thawing, expressing free liquid, and drying the sponge to a moisture content of about 2 to 15% at a temperature below that at which appreciable dextrinization takes place; and then comminuting the dried sponge to a powder.

4. A process of manufacturing a food product comprising forming a paste by heating 4 to 20% commercial starch in water to 70° to 100° C.; mixing an edible material into the paste; then freezing the mixture at 0° to −20° C., whereby the material is formed into a sponge; then thawing, expressing free liquid, and drying the sponge under compression to a moisture content of approximately 2 to 15%, at a temperature below that at which appreciable dextrinization takes place.

5. A process of manufacturing a food product comprising forming a paste by heating 4 to 20% commercial starch in water to 70° to 100° C.; freezing the mixture at 0° to −20° C., whereby the material is formed into a sponge; then thawing, expressing free liquid, and drying the sponge to a moisture content of about 2 to 15% at a temperature below that at which appreciable dextrinization takes place; and incorporating an edible material with the food product.

6. A process of manufacturing a food product comprising forming a paste of commercial starch and water, heating the paste to gelatinize the starch, freezing the gelatinized paste, thawing the frozen product resulting in a porous, spongy, absorbent mass, drying the mass, and incorporating an edible material with the food product.

7. A food product made by the process of claim 1.

8. A food product made by the process of claim 5.

9. A food product made by the process of claim 6.

10. A food product consisting of "starch sponge" and an edible material incorporated therein.

MAJEL M. MacMASTERS.
GUIDO E. HILBERT.

REFERENCES CITED

The following references are of record in the file of this patent:

UNITED STATES PATENTS

| Number | Name | Date |
|---|---|---|
| 1,358,960 | Lorenzen | Nov. 16, 1920 |
| 1,842,933 | Dedrick | Jan. 26, 1932 |
| 1,939,236 | Stokes | Dec. 12, 1933 |
| 2,168,246 | Shepard | Aug. 1, 1939 |
| 2,278,472 | Musher | Apr. 7, 1942 |
| 2,314,459 | Salzburg | Mar. 23, 1943 |
| 2,333,442 | Rex | Nov. 2, 1942 |

FOREIGN PATENTS

| Number | Country | Date |
|---|---|---|
| 401,555 | Great Britain | Nov. 16, 1933 |